United States Patent [19]

Dicke et al.

[11] Patent Number: 4,600,764

[45] Date of Patent: Jul. 15, 1986

[54] THERMOTROPIC AROMATIC POLYESTERS WITH GOOD RIGIDITY AND TOUGHNESS, PROCESS FOR THE PRODUCTION THEREOF AND THE USE THEREOF FOR THE PRODUCTION OF MOULDINGS, FILAMENTS FIBRES AND FILMS

[75] Inventors: Hans-Rudolf Dicke; Ludwig Bottenbruch; Dieter Freitag, all of Krefeld; Aziz E. Sayed, Leverkusen, all of Fed. Rep. of Germany

[73] Assignee: Bayer Aktiengesellschaft, Leverkusen, Fed. Rep. of Germany

[21] Appl. No.: 723,268

[22] Filed: Apr. 15, 1985

[30] Foreign Application Priority Data

Apr. 26, 1984 [DE] Fed. Rep. of Germany ....... 3415530

[51] Int. Cl.$^4$ .................................................. C08G 63/60
[52] U.S. Cl. ...................................... 528/128; 528/125; 528/126; 528/176; 528/193; 528/194; 528/271
[58] Field of Search ............... 528/125, 126, 128, 176, 528/193, 194, 271

[56] References Cited

U.S. PATENT DOCUMENTS

| | | | |
|---|---|---|---|
| 4,226,970 | 10/1980 | Frazer | 528/128 |
| 4,232,143 | 11/1980 | Irwin | 528/128 |
| 4,269,965 | 5/1981 | Irwin | 528/128 |
| 4,381,389 | 4/1983 | Irwin | 528/128 |
| 4,399,270 | 8/1983 | Frazer | 528/128 |
| 4,414,365 | 11/1983 | Sugimoto et al. | 528/128 |
| 4,474,938 | 10/1984 | Richardson | 528/128 |

*Primary Examiner*—Lester L. Lee
*Attorney, Agent, or Firm*—Connolly and Hutz

[57] ABSTRACT

Thermotropic fully-aromatic polyesters which contain radicals of 3,4'- and/or 4,4'-dihydroxybenzophenone in addition to radicals of p-hydroxybenzoic acid, iso- and optionally terephthalic acid, hydroquinone and/or 4,4'-dihydroxydiphenyl, have good rigidity and toughness and yet are easily processible.

6 Claims, No Drawings

THERMOTROPIC AROMATIC POLYESTERS WITH GOOD RIGIDITY AND TOUGHNESS, PROCESS FOR THE PRODUCTION THEREOF AND THE USE THEREOF FOR THE PRODUCTION OF MOULDINGS, FILAMENTS FIBRES AND FILMS

This invention relates to high molecular weight thermotropic fully aromatic polyesters with good rigidity, impact strength and favourable melt viscosity, to a process for the production thereof and to the use thereof for the production of mouldings, filaments, fibres and films.

Those polycondensates which form liquid-crystalline melts are defined as being "thermotropic". They are widely-known, c.f., for example McFarlane et al, Liquid Crystal Polymers II, Contemporary Topics in Polymer Science, Vol. 2, Plenum Publishing Corporation, 1977;

W. J. Jackson and H. F. Kuhfuss, J. Polymer Science, Polymer Chem. Ed. 14, 2042 (1976);

W. C. Wooten et al in A. Ciferri "Ultra-high Modulus Polymers", Applied Science Publ., London 1979, page 362 et seq;

A. Blumstein et al., "Liquid Crystalline Order in Polymers", Academic Press 1978;

A. Ciferri, W. R. Krigbaum, R. B. Meyer "Polymer Liquid Crystals", Academic Press, New York, 1982;

EP Nos. 1185, 1340, 8855, 11 640, 15 856, 17 310, 18 145, 18 709, 22 344, 44 205, 49 615;

U.S. Pat. Nos. 3,991,013, 3,991,014, 4,066,620, 4,067,852, 4,083,829, 4,107,143;

WO Nos. 79/797, 79/1034, 79/1040.

The liquid-crystalline state of polymer melts may be examined using a polarisation microscope: for the examination, the occular was provided with an attachment piece containing a photodiode at the focal point of the occular lens. By means of a connected measuring amplifier with a control device, the measuring value was set at 100 scale divisions on the operating microscope with the Nicol's prisms arranged parallel in the absence of a material sample. A value of 0.01 scale divisions was obtained with crossed Nicol's prisms.

The layer thickness of the examined polycondensate melts was 100 μm.

The polymers were examined after the samples had been melted at a temperature of from 280° to 400° C. The polycondensate was classified as being thermotropic liquid-crystalline provided that there was a brightening of the stationary melt observed between the crossed Nicol's prisms in the entire temperature region or in a part thereof.

The liquid-crystalline polycondensate showed values of more than 1 scale division, in most cases values of from 3 to 90 scale divisions, in the measuring arrangement. However, values of less than 0.1 scale divisions were observed for amorphous melts, such as aromatic polycarbonates.

The above method is particularly suitable for a rapid determination in the laboratory and in almost every case provides unequivocal results. In cases of doubt, however, it may be useful to confirm the presence of liquid-crystalline components in the melt using X-ray wide-angle scattering, as is described, for example, by G. W. Gray and P. A. Windsor in "Plastic Crystals, Physico-Chemical properties and Methods of Investigation", particularly in Chapter 3, John Wiley & Sons, New York, Sydney, Toronto 1974.

DE-OS No. 20 25 971 relates to high molecular weight fully-aromatic polyesters base on p-hydroxybenzoic acid, aromatic dicarboxylic acids (such as terephthalic and isophthalic acid) and diphenols (such as hydroquinone or 4,4'-dihydroxybiphenyl). These polyesters are thermotropic due to the components which are used. They may be processed to produce fibres, for example. Of the 13 polyesters given in the Examples, only one melts at a temperature below 300° C. As a result these polyesters are difficult to process.

Mouldings which are produced from liquid-crystalline melts, have mechanical strength not normally found in unreinforced polycondensates processed from isotropic melt; however, the toughness of such mouldings is somewhat unsatisfactory (c.f. U.S. Pat. No. 4,242,496, EP No. 44 175, W. J. Jackson jr., Brit. Polym. J. 12, 154 (1980)).

Our own examinations have confirmed that thermotropic polyesters with good strength generally have poor toughness and thermotropic polyesters with good toughness generally have poorer strength.

Thus, an object of the present invention is to provide thermotropic fully-aromatic polyesters which have improved processability in comparison with the polyesters known from DE-OS No. 20 25 971 and nevertheless have excellent mechanical properties.

Preferred new thermotropic fully-aromatic polyesters should be thermoplastically processible at a temperature below 370° C., preferably below 350° C., particularly below 330° C.

A further object of the present invention is to provide thermotropic fully-aromatic polyesters which may be processed by thermoplastic shaping to produce mouldings which have both good mechanical strength and good toughness.

Preferred new thermotropic fully-aromatic polyesters should have an impact strength of at least 20, preferably at least 30, more particularly at least 40 kJ/m$^2$. Furthermore, these preferred polyesters should have a notched impact strength of at least 10, preferably at least 20, more particularly at least 25 kJ/m$^2$. Moreover, these preferred polyesters should have a flexural E-modulus of at least 6000, preferably at least 7000, more particularly at least 8000 MPa.

It has surprisingly been found that fully-aromatic polyesters which contain condensed therein radicals of p-hydroxybenzoic acid, isophthalic acid and optionally terephthalic acid and, on the one hand, of hydroquinone and/or 4,4'-dihydroxydiphenyl and, on the other hand, of 3,4'- and/or 4,4'-dihydroxybenzophenone have the desired combination of advantageous properties.

Accordingly this invention provides thermotropic fully-aromatic polyesters based on
  (a) (optionally substituted) p-hydroxybenzoic acid,
  (b) isophthalic acid and optionally terephthalic acid,
  (c) hydroquinone and/or 4,4'-dihydroxydiphenyl and
  (d) 3,4'- and/or 4,4'-dihydroxybenzophenone,
the polyesters containing the condensed radicals
  (a) in a concentration of from 50 to 80, preferably from 55 to 70, more particularly from 60 to 66 mol%,
the condensed radicals
  (c) in a concentration of from 15 to 48, preferably from 20 to 41, more particularly from 20 to 35 mol%,
and the condensed radicals (d) in a concentration of from 2 to 30, preferably from 4 to 25, more particularly from 5 to 20 mol%, based, in each case, on the sum of the radicals (a), (c) and (d), condensed therein, the mol ratio of the condensed radicals b/(c+d) being from 0.95 to 1.05 and the quantity of terephthalic acid radicals based on the radicals (b) being at most 30 mol %.

Preferred (a) p-hydroxybenzoic acids are p-hydroxybenzoic acids substituted in the nucleus by $C_1$–$C_4$ alkyl, $C_1$–$C_4$ alkoxy, $C_6$–$C_{10}$ aryl, $C_7$–$C_{12}$ alkylaryl (such as phenyl, tolyl, naphthyl) or halogen (preferably chlorine) such as 4-hydroxy-2-methylbenzoic acid, 4-hydroxy-3-methyl-benzoic acid, 2-ethyl-4-hydroxybenzoic acid, 3-ethyl-4-hydroxybenzoic acid, 4-hydroxy-2-phenylbenzoic acid, 4-hydroxy-3-phenylbenzoic acid or 3-chloro-4-hydroxybenzoic acid, but preferably unsubstituted p-hydroxybenzoic acid itself.

The polyesters according to the invention may contain the radicals of compounds (a) to (d) in random distribution, in segments or in blocks. Regarding component (a) it should be noted that long or relatively long blocks may greatly increase the melting point and the melt viscosity.

The polyesters according to the invention may contain as terminal groups —COOH, —H, —OH, —OC$_6$H$_5$, acyloxy or radicals deriving from chain terminators. Monofunctional aromatic hydroxyl compounds, such as 4-hydroxydiphenyl, p-nonylphenol, 4-(1,1,3,3-tetramethylbutyl)-phenol, β-naphthol, andaromatic monocarboxylic acids, such as diphenylcarboxylic acids and naphthalene carboxylic acids are preferred chain terminators. Chain terminators may be used in a quantity of from 0.5 to 5 mol%, based on the sum of components a and b.

Branching tri- or higher functional—preferably aromatic—monomers can optionally be used in a quantity of from 0.1 to 1 mol %, based on the sum of components a and b, such as phloroglucinol, 1,3,5-benzene tricarboxylic acid and 3,5-dihydroxy benzoic acid.

The polyesters according to the invention generally have an inherent viscosity of at least 0.5, preferably at least 1.0 dl/g (measured using a solution of 5 mg of polyester/ml p-chlorophenol at 45° C.). If the polyesters are insoluble in p-chlorophenol it is assumed that they have the given minimum viscosity; thus they correspond to the present invention provided that they meet the parameters of the main claim.

The polyesters according to the invention preferably have a melt viscosity of less than 1000 Pa.s, measured at a shear rate of $10^3$ sec$^{-1}$ using a nozzle having a length/diameter ratio of 20 at a temperature below 360° C., preferably below 330° C.

The polyesters according to the present invention may be produced by various processes, for example by condensing or transesterifying the reactive derivatives of compounds (a) to (d), such as the esters or acid chlorides thereof, and then polycondensing them.

Thus, examples of preferred starting compounds are the aryl esters, acyl esters and acid chlorides thereof.

According to a preferred synthesis process, the lower acyl esters, preferably the acetates of compounds (a), (c) and (d) are reacted with isophthalic acid (b) and optionally terephthalic acid, the acyl esters may also be produced in situ.

These reactions may be carried out in the melt phase; however, it is also possible to carry out the reaction in the presence of a liquid heat-transfer medium which has a high boiling point.

The radicals of compounds (a) to (d) are incorporated into the polyesters in the ratio of the starting components.

The polyesters according to the present invention are preferably free from carbonate groups.

It may be appropriate to accelerate catalytically not only the condensation or transesterification reaction but also the polycondensation reactions. Suitable catalysts for this purpose are well known e.g. Lewis acids and hydrohalic acids; oxides, hydrides, hydroxides, halides, alcoholates, phenolates, salts of inorganic or organic acids (preferably carboxylic acid salts), complex salts or mixed salts of alkaline earth metals, such as magnesium, and calcium; of secondary group elements, such as vanadium, titanium, manganese, cobalt, nickel, zinc, lanthanum, cerium, and zirconium or elements from other groups of the Periodic System of the Elements, such as germanium, tin, lead and antimony or the alkali metals or alkaline earth metals themselves, in particular sodium, sodium hydroxide, lithium acetate, sodium acetate, potassium acetate, calcium acetate, magnesium acetate, cobalt acetate, zinc acetate, calcium benzoate, magnesium acetyl acetonate, zinc acetyl acetonate, vanadyl-$C_1$–$C_8$-alkoxides, titanium alkoxides, such as titanium tetrabutylate, titanium tetrapropylate, alkoxy titanium silicates, zirconium butylate, zirconium propylate, titanium tetraphenolate, sodium phenolate, germanium dioxide, antimony trioxide, dialkyl- and diaryl tin oxide, di-butyl-tin-diacetate, di-butyl-dimethoxy-tin. Magnesium-, manganese-, sodium-, potasium- and zinc acetate are particularly preferred.

The catalysts are preferably used in a quantity of from 0.001 to 1, particularly from 0.01 to 0.2% by weight, based on the total weight of the monomers used.

The polyesters according to the invention may be produced at a tempeature of from 160° to 370° C., the reaction generally beginning at a low temperature and the temperature continuously being raised during the course of the reaction. A vacuum may be applied as the reaction slows down, the pressure preferably being continuously reduced from normal pressure to about 0.1 mbar.

The resulting product—preferably in granulated form—may undergo solid phase post-condensation under reduced pressure at a temperature of from 200° to 300° C.; the molecular weight has increased after from 5 to 25 hours and the properties of the polyesters have, as a result, markedly improved.

A further embodiment of the present invention is a process for the production of the new polyesters by reacting components (a) and (d) or the reactive derivatives thereof which may also be produced in situ, optionally in the presence of chain terminators, branching agents and catalysts, at a temperature of from 160° to 370° C., optionally under reduced pressure.

The thermotropic polyesters according to the invention may be advantageously processed from the melt, due to the relatively low melt viscosity thereof, to produce injection moulded parts, filaments, fibres, bands and films, a molecular orientation being caused by the shearing forces produced and being to a great extent influenced by the magnitude of the shearing forces. Furthermore, they have a marked structural viscosity, that is that the melt viscosity drops sharply as the shearing forces inrease. Suitable processing methods are injection moulding, extrusion, pressing and melt spinning.

Mouldings with good tensile strength, exceptional toughness and good dimensional stability may be produced from the polyesters according to the invention. Since these polyesters are extremely chemical-resistant and flame-retarding, they are preferably suitable for the production of electrotechnical articles, such as insulators, printed circuits, plug connectors, and parts for fittings,
parts of chemical engineering apparatus, such as pipes, linings for containers, rotors, sliding bearings, and sealings,
parts for the interior equipment of aircraft,
parts for technical apparatus, such as elements of air conditioning systems and parts of valves.

The polyesters according to the present invention can also be used as covering and coating materials (in powdered or dispersed form). They are also very suitable for the production of reinforced or filled moulding compositions with a reinforcer or filler content of from 5 to 65% by weight, based on the reinforced or filled moulding composition.

Thus a further embodiment of the present invention is the use of the new polyesters for the production of mouldings, filaments, fibres and films.

EXAMPLES

The impact strength $a_n$ and the notched impact strength $a_k$ are tested on standard small rods according to DIN 53 453 (ISO/R 179) at 23° C., in each case using 10 test samples.

The flexural strength is determined on standard small rods according to DIN 53 452 (ISO/R 178). The flexural E-modulus is obtained according to DIN 53 457. The dimensional stability under heat is measured by determining the Vicat-B-softening temperature according to DIN 53 460 (ISO 306).

COMPARISON 1

The following materials are weighed in a 1 litersurface grinding vessel with a surface grinding cover, stirring device, nitrogen supply device, and a distillation attachment part, which is connected to a condenser:

2.4 mols=331.49 g p-hydroxy benzoic acid,
1.44 mols=239.23 g isophthalic acid,
1.44 mols=158.56 g hydroquinone,
6.33 mols=646.23 g acetic anhydride,
0.1 g anhydrous magnesium acetate and
0.15 g antimony trioxide.

The mixture is heated to 170° C. under nitrogen atmosphere by means of a salt bath. When the distillation of acetic acid has subsided (after about 45 minutes), the temperature in the reaction vessel is raised over a period of 1 hour to 250° C. and over a period of a further hour to 330° C. After distillation has ceased, the pressure is reduced to about 1 mbar over the course of 30 minutes.

The viscosity of th resulting polymer melt markedly increases during the vacuum phase. The melt is therefore stirred more slowly.

At the end of this phase, a total quantity of 709 g of acetic acid (containing residual acetic anhydride) is recovered.

The resulting light-brown polyester is ground and subjected to solid phase post-condensation at 250° C. (under a vacuum of 1 mbar, 24 hours). The inherent viscosity of the polyester obtained in this manner is 1.2 dl/g.

EXAMPLE 1

The following materials are introduced into the reaction vessel described in comparison 1:

2.4 mols=331.49 g p-hydroxy benzoic acid,
1.44 mols=239.23 g isophthalic acid,
1.2 mols=132.13 g of hydroquinone,
0.24 mols=51.42 g 4,4'-dihydroxybenzophenone,
6 mols=612.54 g acetic anhydride,
0.1 g magnesium acetate (anhydrous) and
0.15 g antimony-III-oxide.

The mixture is heated to 170° C. under nitrogen atmosphere by means of a salt bath. After an hour at 170° C. the reaction temperature is raised to 220° C. and then to 330° C. over a further 2 hours. After distillation has ceased, the pressure is reduced to 2.5 mbars over a period of about 20 min. The product remains easily-stirrable during the vacuum phase. At the end of this phase, a total quantity of 705 g of acetic acid (containing residual acetic anhydride) is recovered.

The resulting light-beige product is ground and subjected to solid phase post-condensation at 250° C. 1 mbar/24 hours). The inherent viscosity of the polyester treated in this manner is 1.27 dl/g. An optically-anisotropic melt phase is observed in the region of from 320° C. to 400° C.

EXAMPLES 2 TO 10

Further polyesters are prepared in the reaction apparatus described in Example 1 and by the process described therein. The type and quantity of the starting materials are listed in Table 1.

TABLE 1

| Example | (a) (mol) | (b) (mol) | (c) (mol) | (d) (mol) | Acetic anhydride (mol) | $\eta_{inh}$ (dl/g) | anisotropic melt |
|---|---|---|---|---|---|---|---|
| 2 | 2.4 | 1.44 IS | 1 hy | 0.44 4,4'-D | 6.3 | 1.75 | 310–400° C. |
| 3 | 2.4 | 1.44 IS | 1.34 hy | 0.1 4,4'-D | 6.3 | 1.15 | 330–400° C. |
| 4 | 3 | 1 IS | 0.8 hy | 0.2 4,4'-D | 6.0 | 1.04 | 300–400° C. |
| 5 | 2.6 | 1.4 IS | 1.2 hy | 0.2 4,4'-D | 6.4 | 0.75 | 290–400° C. |
| 6 | 2.4 | 1.2 IS | 1.0 hy | 0.2 4,4'-D | 5.8 | 1.18 | 295–400° C. |
| 7 | 2.94 | 1.26 IS | 0.86 hy | 0.4 4,4'-D | 6.4 | 1.05 | 305–400° C. |
| 8 | 2.94 | 1.26 IS | 1.16 hy | 0.1 4,4'-D | 6.4 | 1.37 | 330–400° C. |
| 9 | 2.4 | 1.2 IS 0.24 TS | 1.2 hy | 0.24 4,4'-D | 6.3 | 1.93 | 310–400° C. |
| 10 | 2.4 | 1.0 IS 0.44 TS | 1.2 hy | 0.34 4,4'-D | 6.3 | 2.4 | 330–400° C. |

Abbreviations: IS = isophthalic acid; TS = terephthalic acid; hy = hydroquinone, 4,4'-D = 4,4'-dihydroxybenzophenone;

Standard small rods were produced by injection moulding from the polyesters of comparison 1 and Examples 1 to 10 to test the mechanical properties thereof. The values which were measured are given in Table 2.

TABLE 2

| Example | Vicat B (°C.) | $a_n/a_{k2}$ (kJ/m) | Flexural strength (MPa) | Flexural E-modulus (MPa) | Processing temperature (°C.) |
|---|---|---|---|---|---|
| 1 | 144 | 30*/18* | 199 | 8500 | 330 |
| 2 | 143 | 85*/42* | 209 | 8400 | 330 |
| 3 | 143 | 18*/10 | 184 | 9200 | 350 |
| 4 | 132 | 24*/20* | 132 | 8000 | 330 |
| 5 | 132 | 21*/13* | 125 | 7700 | 320 |
| 6 | 136 | 44*/35* | 148 | 9300 | 340 |
| 7 | 145 | 37*/24 | 156 | 6000 | 350 |
| 8 | 154 | 27*/17* | 202 | 10700 | 350 |
| 9 | 144 | 36*/29* | 188 | 10350 | 320 |
| 10 | 146 | 28*/28* | 194 | 10900 | 340 |
| Comparison 1 | 140 | 8/6 | 150 | 6500 | 340 |

*partly broken

We claim:

1. Thermotropic fully-aromatic polyester comprising co-condensed units of
   (a) 50 to 80 mol % p-hydroxybenzoic acid, or p-hydroxybenzoic acid substituted by $C_1$-$C_4$ alkyl, $C_1$-$C_4$ alkoxy, $C_6$-$C_{10}$ aryl, $C_7$-$C_{12}$ alkylaryl or halogen,
   (b) isophthalic acid or a mixture of isophthalic acid and terephthalic acid,
   (c) 15 to 48 mol % hydroquinone, 4,4'-dihydroxydiphenyl, or both and
   (d) 2 to 30 mol % 3,4'-dihydroxybenzophenone, 4,4'-dihydroxybenzophenone, or both
wherein the amounts of (a), (c) and (d) are based on the sum of the condensed units (a), (c) and (d) with the mol % of (b) determined by the ratio of the condensed units b/(c+d) which is from 0.95 to 1.05 and the proportion of terephthalic acid units based on the total of units (b) being at most 30 mol %.

2. Polyesters according to claim 1, characterised in that they contain the condensed radicals
   (a) in a concentration of from 55 to 70 mol%, the condensed radicals
   (c) in a concentration of from 20 to 41 mol%, and the condensed radicals
   (d) in a concentration of from 4 to 25 mol%, in each cased based on the sum of the condensed radicals (a), (c) and (d).

3. Polyesters according to claim 1, characterised in that they contain the condensed radicals
   (a) in a concentration of from 60 to 66 mol%, the condensed radicals
   (c) in a concentration of from 20 to 35 mol%, and the condensed radicals
   (d) in a concentration of from 5 to 20 mol%, in each case based on the sum of the condensed radicals (a), (c) and (d).

4. Process for the production of the polyesters according to claim 1 by reacting the reactive derivatives of components (a) to (d), which may also be produced in situ, at a temperature of from 160° to 370° C.

5. Process according to claim 4, characterised in that solid phase post-condensation is subsequently carried out.

6. Moldings, filaments, fibers and films produced from the polyester according to claim 1.

* * * * *